D. HEWITT.
COTTON BOLL PICKER.
APPLICATION FILED JULY 21, 1914.

1,138,952.

Patented May 11, 1915.
2 SHEETS—SHEET 1.

Witnesses
M. J. Pfeifer.
L. C. Barkley.

Inventor,
Daniel Hewitt,
by Franks Akkerman,
Attorney

D. HEWITT.
COTTON BOLL PICKER.
APPLICATION FILED JULY 21, 1914.
1,138,952.
Patented May 11, 1915.
2 SHEETS—SHEET 2.
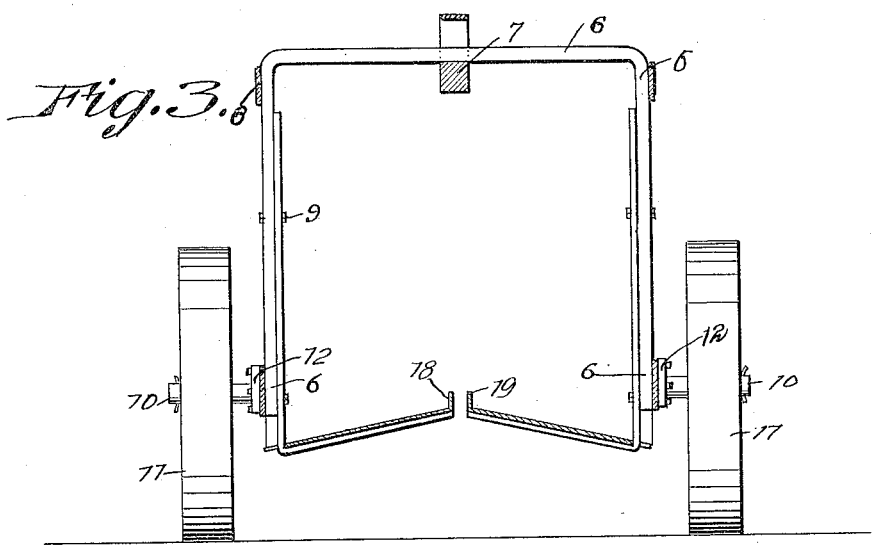
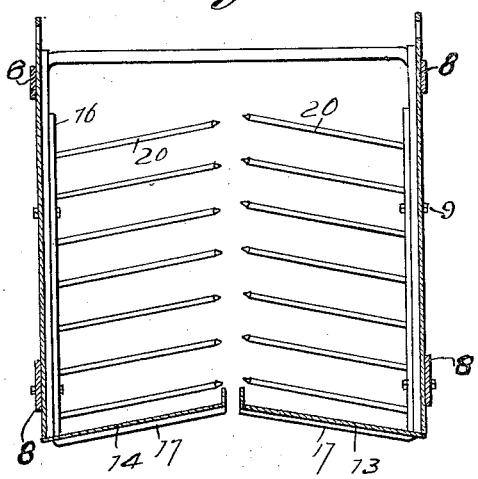
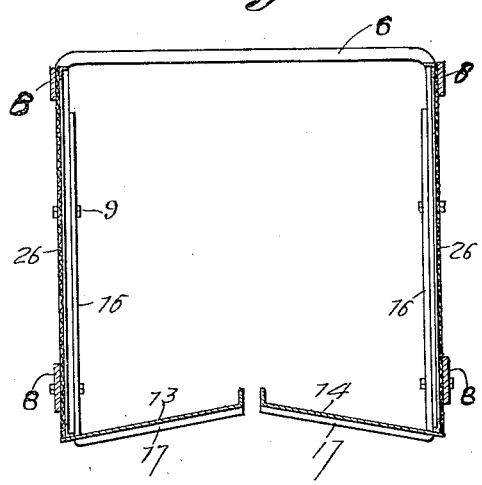
Witnesses
M. I. Pfeifer
K. E. Barkley
Inventor
Daniel Hewitt
by Franks Appleman,
Attorney

UNITED STATES PATENT OFFICE.

DANIEL HEWITT, OF TYLER, TEXAS.

COTTON-BOLL PICKER.

1,138,952.     Specification of Letters Patent.     Patented May 11, 1915.

Application filed July 21, 1914. Serial No. 852,294.

*To all whom it may concern:*

Be it known that I, DANIEL HEWITT, a citizen of the United States of America, and resident of Tyler, in the county of Smith and State of Texas, have invented certain new and useful Improvements in Cotton-Boll Pickers, of which the following is a specification.

This invention relates to cotton harvesters and particularly to machines for gathering cotton contained in bolls which have not opened and which, owing to conditions of growth, are unlikely to open in their natural development, a condition which obtains when the season is late or dry, and the product is imperfect.

This invention, therefore, is designed for collecting, picking or gathering the bolls, the invention serving to remove the bolls from the stalks or stems so that they may be delivered to bags or receptacles or so deposited that they may be readily collected for treatment.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
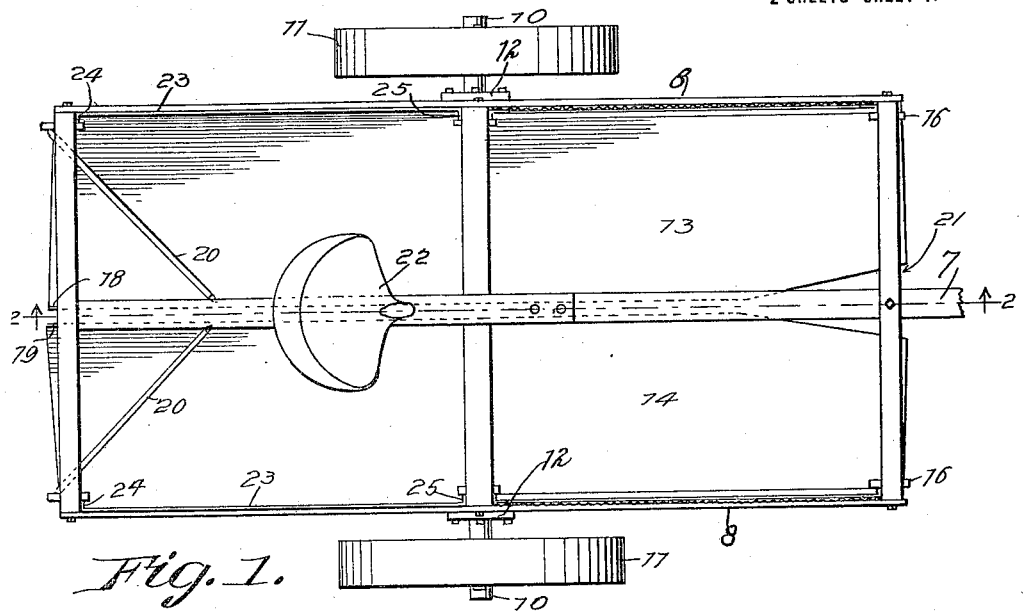
Figure 2:
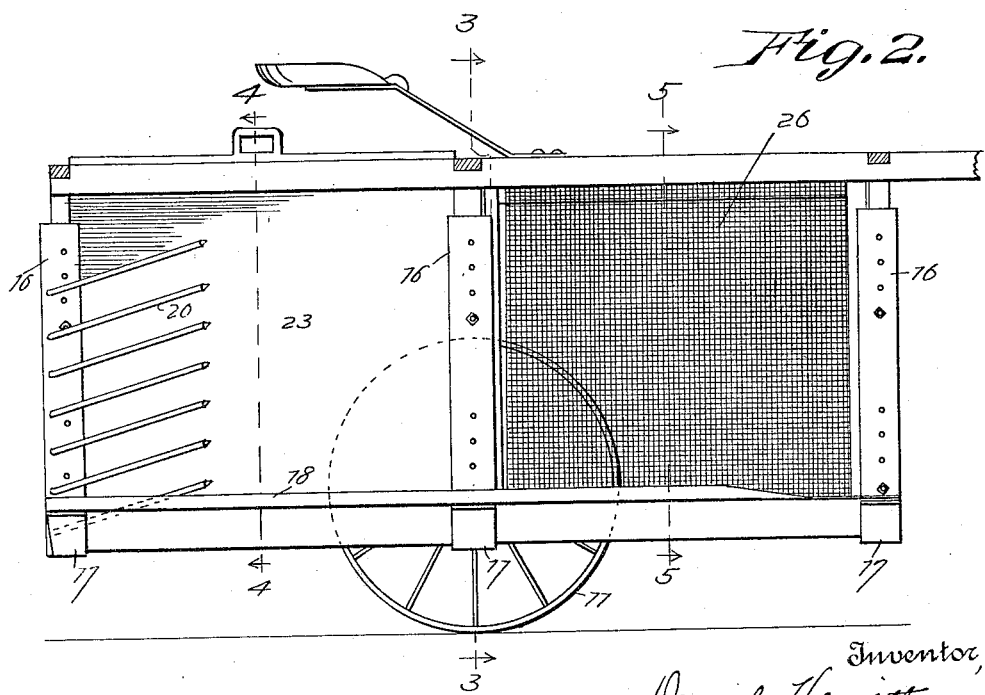

Figure 1 illustrates a top plan view of a boll gathering machine, embodying the invention; Fig. 2 illustrates a sectional view on the line 2—2 of Fig. 1, the central beam being in elevation; Fig. 3 illustrates a sectional view on the line 3—3 of Fig. 2; Fig. 4 illustrates a sectional view on the line 4—4 of Fig. 2; and Fig. 5 illustrates a sectional view on the line 5—5 of Fig. 2.

In these drawings, I have illustrated a frame including a bed or container for the bolls after they have been removed from the stalks or stems and in the production of said frame, I utilize a plurality of inverted U-shaped ribs 6 attached at their upper portions to a beam 7, which extends in front of the machine and constitutes an attachment for any suitable draft rigging for pulling the machine.

The ribs are connected at the sides by longitudinally extending rods or plates 8, and the said beam and plates 8 are secured to the ribs in any appropriate way as by fastenings 9 which may have the form of bolts, or the like.

Extending from the said frame at a point intermediate its length, preferably from the central rib, are the spindles 10 on which the traction wheels 11 are rotatable and, as shown in the drawings, the said spindles are carried by the plates 12 which are attached to the central rib and to the lower longitudinally disposed plate 8 on each side of the frame.

The gatherer has a bottom consisting of two sections 13 and 14 spaced apart at the center, the said space therebetween forming a clearance for the passage therethrough of the stalks or stems of cotton as the machine moves along the row. In constructing the bottom or the sections thereof, I provide hangers 16 which are bolted or otherwise secured to the ribs, and the said hangers have angularly disposed ends 17 extending upwardly on an incline toward the center line of the machine, thus the said hangers support the sectional bottom in an inclined position, the highest point of which are near the center line of the machine and it will be apparent that the tendency will be for the bolls to gravitate away from the said central line toward the outer sides of the frame or body. The inner edges of the sectional body have upwardly extending flanges 18 and 19 respectively, which flanges serve to prevent the bolls from passing through the opening or space between the sectional bottom.

At the rear of the frame and preferably constituting a part of the rear hangers are gathering fingers 20, the said fingers having their ends anchored to the rear hangers and the said fingers extending inwardly and forwardly so that they terminate on planes which aline with the upwardly extending flanges 18 and 19.

As seen in Fig. 1, of the drawing, the sectional bottom at the forward edge is cut away to form a flared opening 21 which merges with the restricted space between the two edges of the sectional bottom as the stalks are thereby guided to the restricted space between the sectional bottom and the fingers are brought into contact with the branches of the plant and bolls on said plant are removed as the branches thereof escape through the fingers. The fingers may be spaced apart a suitable distance to insure the gathering of the bolls, thus cleaning the plants of said bolls by once running the gathering machine over the said plants.

Any suitable seat, such as the seat 22, may be supported from the beam or any appropriate provision may be made for the operator.

At the rear of the machine and at the sides thereof, vertically sliding doors 23 are provided and the hangers 16 constitute guides for the door as the said hangers are slightly wider than the ribs and the door 23 has flanges 24 and 25 which fit between the hangers and the side plates 8, as fully shown in Fig. 1. Thus the doors may be drawn upwardly to permit the removal of the bolls which have been gathered and by tilting the said gatherer rearwardly, the bottom may be caused to incline rearwardly so that the bolls will gravitate toward the openings in the sides of the gatherer.

The sides of the gatherer toward the front of the machine, in this embodiment of the invention, are inclosed by a wire screen 26.

I claim

1. In a cotton boll picker, a frame including inverted U-shaped ribs, hangers connected to the said ribs, said hangers being wider than the ribs and constituting guides for doors, a sectional bottom supported by the hangers, plates on the outer surfaces of the ribs and forming the sides of the frame, doors guided between the said plates and the hangers, and fingers at the rear of the frame for gathering bolls.

2. In a cotton boll picker, a frame including U-shaped ribs and side plates, hangers supported by the ribs and having inwardly and upwardly projecting extensions, a sectional bottom supported by the angular portions of the hangers, the said sectional bottom having a space between the inner edges and the said sectional bottom having a flared opening merging with the opening between the sections at the rear, and fingers carried by the frame for moving bolls from the plants.

In testimony whereof, I affix my signature in the presence of two witnesses.

DANIEL HEWITT.

Witnesses:
QUINN URBAN,
J. M. STEPHENS.

Copies of this patent may be obtained for five cents each, by addressing the "Commissioner of Patents, Washington, D. C."